(No Model.) 2 Sheets—Sheet 1.
J. W. DUNHAM & G. W. & F. P. KISINGER.
DUMPING WAGON.
No. 449,212. Patented Mar. 31, 1891.
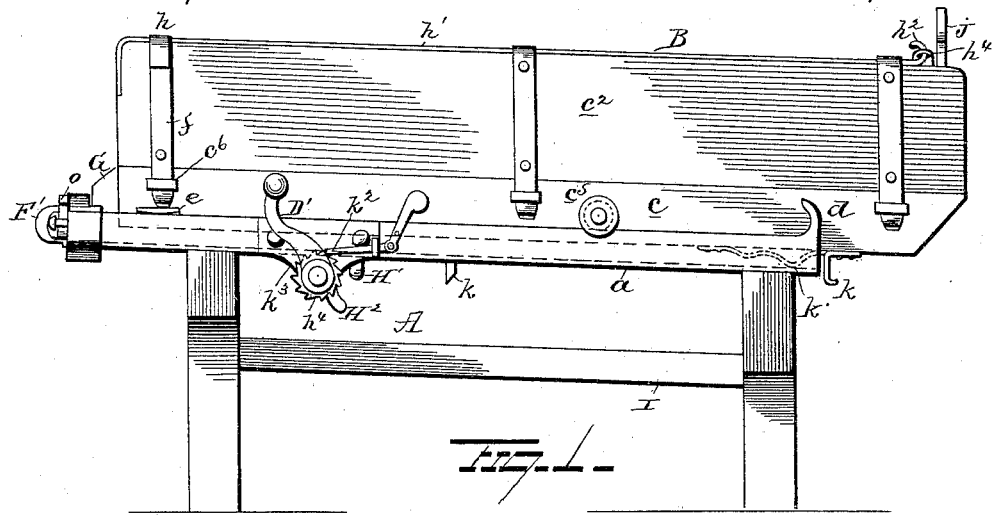
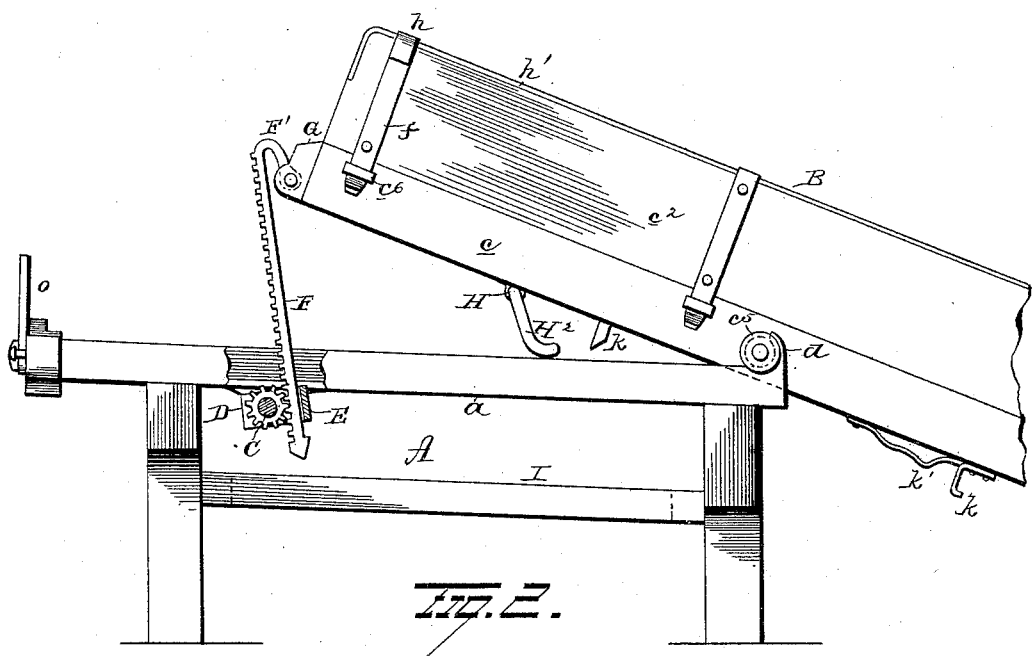

(No Model.) 2 Sheets—Sheet 2.
J. W. DUNHAM & G. W. & F. P. KISINGER.
DUMPING WAGON.
No. 449,212. Patented Mar. 31, 1891.
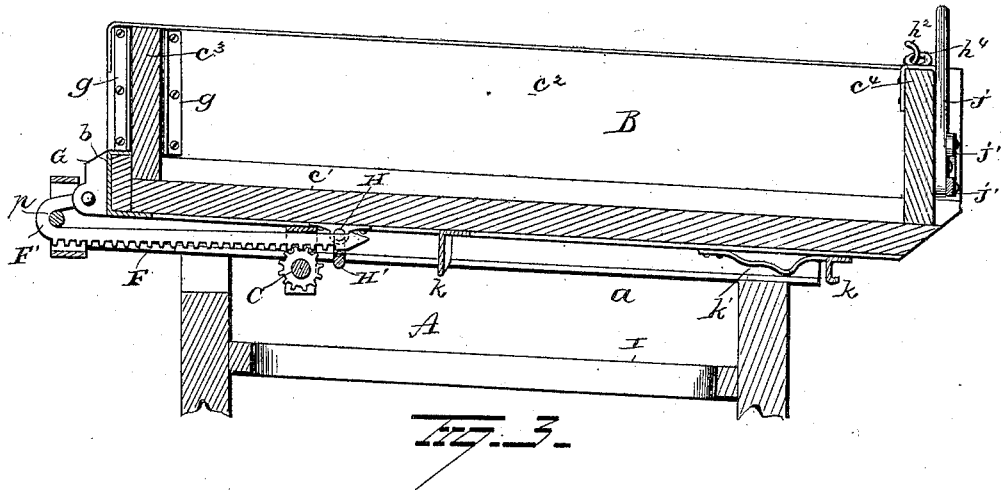
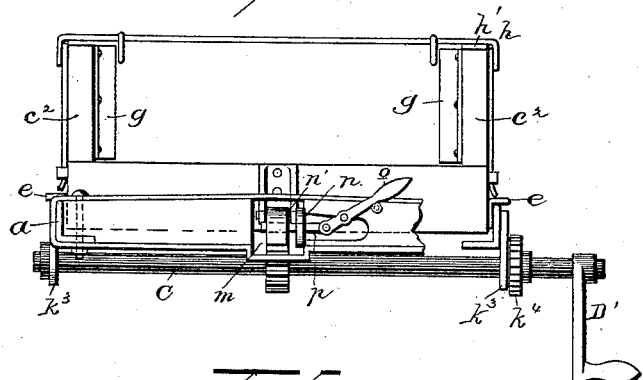
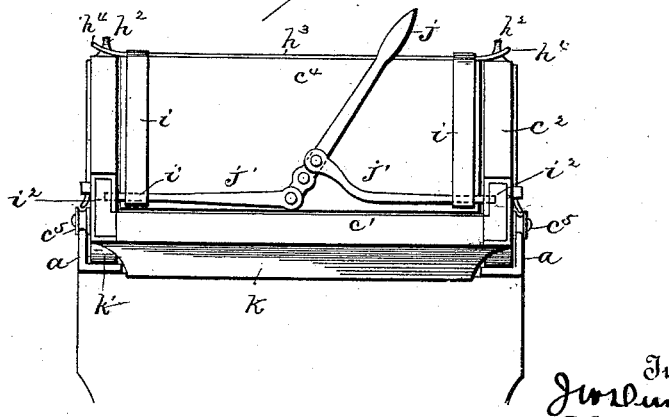

UNITED STATES PATENT OFFICE.

JOSEPH W. DUNHAM, OF ENGLEWOOD, AND GEORGE W. KISINGER AND FRANK P. KISINGER, OF DANVILLE, ILLINOIS.

DUMPING-WAGON.

SPECIFICATION forming part of Letters Patent No. 449,212, dated March 31, 1891.

Application filed October 3, 1890. Serial No. 366,947. (No model.)

*To all whom it may concern:*

Be it known that we, JOSEPH W. DUNHAM, of Englewood, in the county of Cook, and GEORGE W. KISINGER and FRANK P. KISINGER, of Danville, in the county of Vermilion, and State of Illinois, have invented certain new and useful Improvements in Dumping-Wagons; and we do hereby declare the following to be a full, clear, and exact description of the invention, such as will enable others skilled in the art to which it appertains to make and use the same.

Our invention relates to an improvement in dumping-wagons, its object being to provide a dumping-wagon with devices whereby the body may be moved longitudinally and elevate one end thereof.

A further object is to so construct a dumping-wagon and devices attached thereto that the same devices may be employed for moving the body longitudinally and raising one end thereof.

A further object is to produce a dumping-wagon which shall be of simple durable construction, comparatively cheap to manufacture, and effective in operation.

With these objects in view the invention consists in certain novel features of construction and combinations and arrangements of parts, as hereinafter set forth, and pointed out in the claims.

In the accompanying drawings, Figure 1 is a side elevation of a wagon embodying our invention. Fig. 2 is a similar view showing the wagon-body in position for dumping. Fig. 3 is a longitudinal vertical section of Fig. 1. Fig. 4 is a front end view. Fig. 5 is a rear end view.

A represents a wagon-bed mounted on wheels in the usual manner. The sides of the wagon-bed are composed of angle-irons $a$, which are connected at their forward ends by a metallic-faced cross-bar $b$ and serve to support and form slides for the wagon-body B. The body B comprises a metallic-faced frame $c$, to which rollers $c^5$ are journaled and adapted to run upon the upturned portions of the angle-irons $a$, a bottom $c'$, side-boards $c^2$, and and-boards $c^3$ $c^4$. The rollers $c^5$ are preferably located somewhat rearwardly of the center of the sides of the wagon-body, and are adapted to engage stops $d$ at the ends of the angle-irons and form trunnions on which the body B will turn, as more fully explained farther on. The forward portion of the body is supported upon the angle-irons by brackets $e$, projecting from the frame $c$. The side-boards $c^2$ are provided with plates $f$, which project below the edges of said boards and are adapted to pass through eyes or loops on the frame $c$, whereby said side-boards are removably attached to the frame $c$. The side-boards $c^2$ are provided on their inner faces, in proximity to the forward ends thereof, with guides or ways $g$, between which the front end-board $c^3$ is inserted. Secured to the top edge of the front end-board $c^3$ is a plate $h$, preferably of spring metal, the ends of which are bent downwardly and adapted to embrace the side-boards $c^2$. The top edges of the side-boards $c^2$ are provided with metallic plates $h'$, which extend from the forward ends thereof to points in proximity to their rear ends, where they are provided with hooks $h^2$. The tail-board $c^4$ is provided on its top edge with a metallic plate $h^3$, which extends beyond the ends of said tail-board, and is provided with eyes or loops $h^4$ for the reception of the hooks $h^2$. Metallic plates $i$ are secured to the rear face of the tail-board $c^4$ and project at their upper ends over the plate $h^3$ on the top edge of the tail-board, their lower ends being provided with loops $i'$. Pivoted to the tail-board $h^4$, preferably near its lower edge, is a hand-lever $j$, to which are pivoted at opposites sides, or rather above and below its fulcrum, the inner ends of two bars $j'$, the free ends of said bars being adapted to pass through the loops $i'$ of the plates $i$ and enter sockets $i^2$ in the frame $c$, and thus lock the tail-boards in place.

Secured to the bottom of the wagon-body are stops $k$, adapted to limit the movements of said body and preventing its escape from the wagon-bed.

Secured to the body B at opposite sides thereof and in proximity to its rear end are two inclined plates or blocks $k'$, adapted when the body is moved to its normal position to ride upon the angle-irons and maintain the body level.

Journaled in suitable brackets $k^3$, secured to the angle-irons $a$ of the wagon-bed in proximity to the forward end thereof, is a shaft C, provided near one end with a ratchet-wheel $k^4$ and a dog $k^2$, which latter may be provided with a lever by means of which to release it from the ratchet-wheel $k^4$ when desired.

Fixed to the shaft C, preferably at its center, is a pinion D, and loosely mounted on said shaft and embracing the pinion D is a bracket or loop E, which extends somewhat beyond said pinion and serves as a guide for a rack-bar F, which passes through it and meshes with the pinion D. One end of the shaft C is extended beyond its bearing and provided with a crank $D'$ by means of which to turn it. The forward end of the rack-bar F is bent to produce a loop $F'$, and is pivoted in a bracket G, secured to the forward end of the body B. The forward end bar of the frame $c$ of the wagon-bed is provided with an opening or perforation $m$ for the reception of the loop $F'$ of the rack-bar F.

Secured to the front cross-bar $b$ and adapted to project through the perforation $m$ is a plate $n$, provided near its forward end with a perforation $n'$, and pivoted to said cross-bar in proximity to the opening or perforation $m$ is a lever $o$, to the free end of which a bolt $p$ is pivotally connected. The bolt $p$ is adapted to lie parallel with the cross-bar $b$ and to pass through the perforation $n'$ in the plate $n$ and enter the loop $F'$ of the rack-bar F, thus maintaining the body locked in its normal position and preventing it from longitudinal movement at an improper time.

Mounted on the bottom of the wagon-body in proximity to the free end of the rack-bar F is a shaft H, having a crank-arm $H'$ and a handle $H^2$ by means of which to operate it. Normally this crank-shaft is turned so that its crank $H'$ will be below the free rear end of the rack-bar F and prevent said rack-bar from movement on its pivot at the forward end of the wagon-body.

Assuming now that the wagon-body is in its normal position and it is desired to "dump" it, the lever $o$ is first operated to withdraw the bolt $p$, whereupon the body will be unlocked from the bed A. The crank $D'$ is then operated, and, the pinion D meshing with the rack-bar F, the body B will be moved rearwardly until the rollers $c^5$ engage the stops $d$. The crank-shaft H will now be turned so that its crank $H'$ will move out of line with the rear end of the rack-bar F, and the crank $D'$ turned in a direction opposite to that above described. The free rear end of the rack-bar F now being free, the bracket or loop E will be turned on the shaft D by the weight of the rear end of the rack-bar, and while the crank is being turned said rack-bar will assume a vertical position and elevate the forward end of the wagon-body and lower the rear end thereof. This pivotal movement of the rack-bar F is permitted and the rack-bar guided in its movements by a slotted bar or reach I, secured to the wagon.

It is evident that slight changes might be made in the details of construction of our device without departing from the spirit thereof or limiting its scope. Hence we do not wish to restrict ourselves to the precise details of construction herein set forth; but, Having fully described our invention, what we claim as new, and desire to secure by Letters Patent, is—

1. The combination, with a wagon bed and a body, of a shaft journaled to the bed, a pinion on the shaft, and a rack-bar connected to the shaft and wagon-body, so that when said shaft is turned in one direction the body will be moved longitudinally and when turned in the other direction one end of said body will be raised, substantially as set forth.

2. The combination, with a wagon bed and a body, of a shaft journaled to the bed, a pinion on the shaft, a rack-bar connected to the wagon-body and to the shaft, and a crank-shaft for maintaining said rack-bar normally parallel with the bottom of the wagon-body, substantially as set forth.

3. The combination, with a wagon bed and a body, of a shaft journaled thereon, a pinion on said shaft, a rack-bar pivoted at one end to the wagon-body, and a bracket or loop loosely mounted on the shaft, through which said rack-bar is adapted to slide, substantially as set forth.

4. The combination, with a wagon bed and a body, of a shaft journaled to the bed, a pinion on said shaft, a rack-bar pivoted at one end to the wagon-body and loosely connected to the shaft, and a slotted bar or reach for guiding the rack-bar, substantially as set forth.

5. The combination, with a wagon bed and a body, of a shaft journaled in the bed, a pinion on said shaft, a rack-bar having a loop at one end and pivotally connected to the wagon-body and connected with the shaft, and a bolt on the bed and adapted to enter the loop of the rack-bar and lock the body, substantially as set forth.

6. The combination, with a wagon-body, of metallic plates on the side-boards thereof having hooks at the rear ends, a tail-board, a metallic plate on the tail-board having perforations in its ends to receive the hooks on the plates on the side-boards, bolts for locking said tail-board to the body, and a lever for manipulating said bolts, substantially as set forth.

7. In a wagon, the combination, with the bed, of a body mounted thereon and adapted to slide forwardly, and inclined blocks or plates on said body at or near the rear end thereof and adapted to rest on said bed and maintain the body in a horizontal position when in its forward position, substantially as set forth.

In testimony whereof we have signed this specification in the presence of two subscribing witnesses.

JOSEPH W. DUNHAM.
GEORGE W. KISINGER.
FRANK P. KISINGER.

Witnesses as to signatures of Joseph W. Dunham and George W. Kisinger.
FRANK H. DENISON,
JOHN D. MORTON.

Witnesses as to signature of Frank P. Kisinger:
H. C. PATTERSON,
GEORGE DILLON.